United States Patent [19]

Sessa et al.

[11] Patent Number: 5,362,327
[45] Date of Patent: Nov. 8, 1994

[54] APPARATUS FOR PRODUCING A COATING ON AN INTERNALLY THREADED FASTENER

[75] Inventors: Eugene Sessa, Mt. Clemens; Richard Duffy, Shelby Township, both of Mich.

[73] Assignee: Nylok Fastener Corporation, Macomb, Mich.

[21] Appl. No.: 123,701

[22] Filed: Sep. 17, 1993

Related U.S. Application Data

[60] Continuation of Ser. No. 814,105, Dec. 26, 1991, abandoned, which is a continuation-in-part of Ser. No. 781,102, Oct. 22, 1991, Pat. No. 5,141,771, which is a division of Ser. No. 424,810, Oct. 20, 1989, Pat. No. 5,090,355.

[51] Int. Cl.5 .................. B05C 19/00; B05B 13/06
[52] U.S. Cl. .................. 118/308; 118/318; 118/321; 118/703; 118/681; 427/181; 427/195
[58] Field of Search .............. 118/308, 317, 321, 323, 118/703, 681; 427/181, 195

[56] References Cited

U.S. PATENT DOCUMENTS

| | | | |
|---|---|---|---|
| 3,385,261 | 5/1968 | Wittemann et al. | 118/317 |
| 3,452,714 | 7/1969 | Burke et al. | 118/620 |
| 3,592,676 | 7/1971 | From, Jr. et al. | 118/308 |
| 3,797,455 | 3/1974 | Sheffer et al. | 118/301 |
| 3,896,760 | 7/1975 | Duffy et al. | 118/308 |
| 3,995,074 | 11/1976 | Duffy et al. | 427/181 |
| 4,060,868 | 12/1977 | Axvig et al. | 118/308 |
| 4,100,882 | 7/1978 | Duffy et al. | 118/308 |
| 4,120,993 | 10/1978 | Duffy et al. | 118/308 |
| 4,426,410 | 1/1984 | Watson | 427/234 |
| 4,528,938 | 7/1985 | Neville | 118/411 |
| 4,704,985 | 11/1987 | Rubinstein | 118/321 |
| 4,775,555 | 10/1988 | Duffy | 118/308 |
| 4,779,559 | 10/1988 | Gould et al. | 118/317 |
| 4,835,819 | 6/1989 | Duffy et al. | 427/195 |
| 4,842,890 | 6/1989 | Sessa et al. | 427/47 |

FOREIGN PATENT DOCUMENTS

8906757  7/1989  WIPO .................. 411/428

Primary Examiner—W. Gary Jones
Assistant Examiner—Dean T. Nguyen
Attorney, Agent, or Firm—Niro, Scavone, Haller & Niro

[57] ABSTRACT

An apparatus for coating an internally threaded fastener includes a support having a support aperture in axial alignment with an aperture in the fastener, a nozzle for applying a coating onto the internal threads located on the fastener aperture, means for reciprocally moving the nozzle through said support aperture and into said fastener aperture to align with the fastener threads, and means for maintaining the spray head in a stationary position within the fastener aperture while said reciprocally moving means continues through its reciprocal cycle.

5 Claims, 11 Drawing Sheets

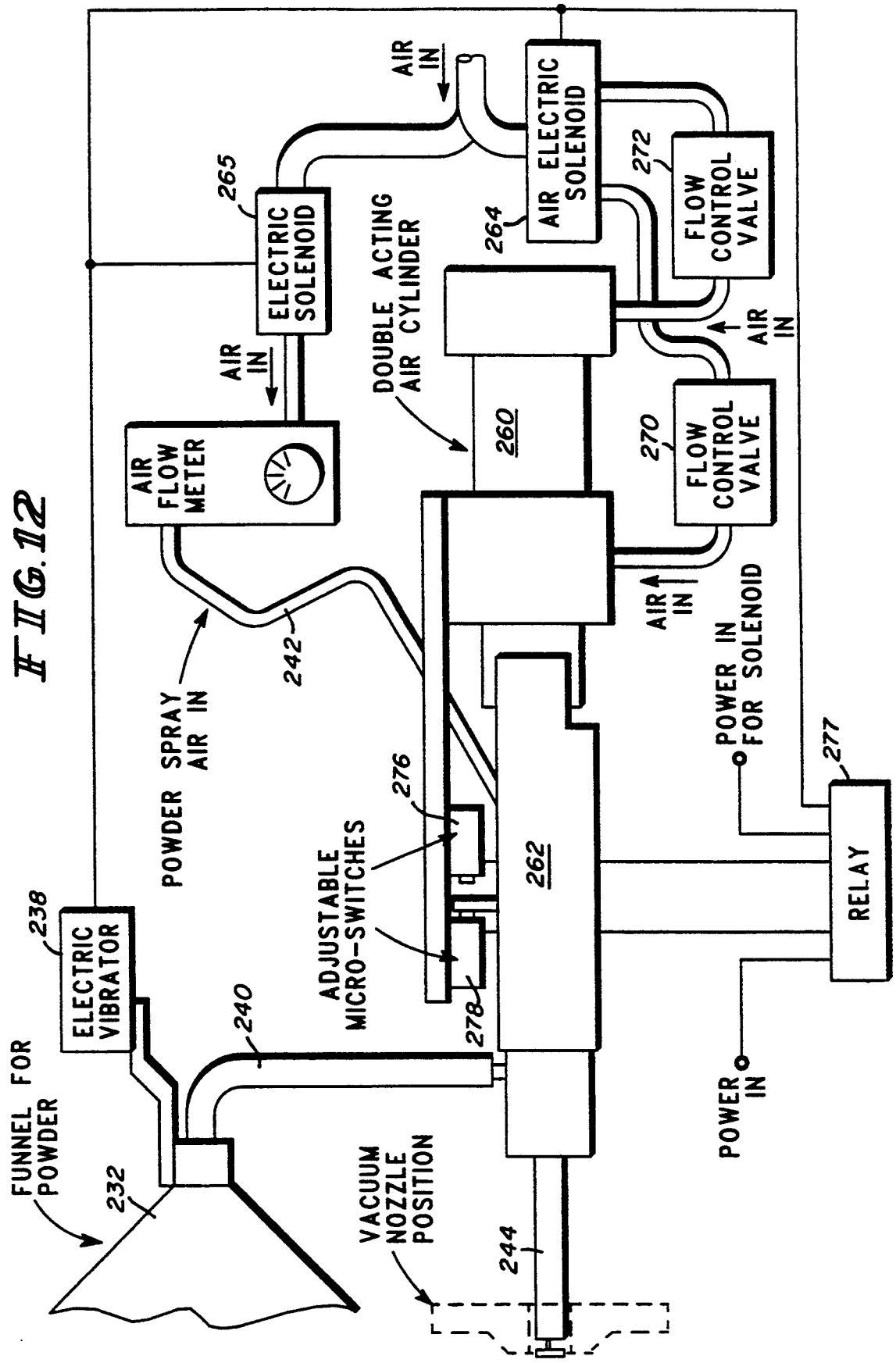

APPARATUS FOR PRODUCING A COATING ON AN INTERNALLY THREADED FASTENER

This application is a continuation of Ser. No. 07/814,105, filed Dec. 26, 1991, now abandoned, which is a continuation-in-part of prior U.S. Ser. No. 07/781,102 filed on Oct. 22, 1991 and issued as U.S. Pat. No. 5,141,771, which is a divisional of U.S. Ser. No. 07/424,810 filed on Oct. 20, 1989 and issued as U.S. Pat. No. 5,090,355.

BACKGROUND OF THE INVENTION

The present invention relates to an improved process and apparatus for the manufacture of threaded fasteners having a coating or patch applied to the threads. More particularly, this invention relates to a method and device for the manufacture of sample fasteners, where it is necessary to develop new products or produce small quantities of existing products as samples for potential customers.

Prior art patents disclose various methods and devices for applying locking patches or coatings of resilient resin. Generally, a rotatable table or endless belt conveyor is disposed to receive fasteners and transport them through a plurality of stations to effect application of the coating. Examples of such disclosures include U.S. Pat. Nos. 4,100,882 an 4,835,819 to Duffy et al.

In the past attempts have been made to develop machines that could produce individual or small quantities of sample product as well as providing high volume production equipment with increased processing speeds and increased versatility at reduced costs. The attempts, however, have resulted in machines that were makeshift, not compact, and difficult to regulate. Some of these problems, and the concepts of some aspects of the present invention, are disclosed in U.S. Pat. No. 4,835,819, which is incorporated herein by reference.

SUMMARY OF THE INVENTION

The above objects and others, which will become apparent in the description, are achieved by providing apparatuses and methods for applying powder to threaded articles, including fasteners such as threaded studs, screws, bolts, nuts, and the like. In one aspect of the invention a means for heating raises the temperature of the threaded article so that powder will melt, thereby adhering to the fastener to form a coating.

Means is also provided for spraying the powder, including means for controlling the rate of spray. Means is also provided for linearly moving the fastener between the heating means and the spraying means. The means providing movement includes support for the fastener that can be rotatably engaged with a motor to rotate the fastener during coating.

In another embodiment the apparatus includes a heating means and a fixed means for supporting the fastener. An air nozzle for spraying the powder is operatively connected to a reciprocally moving means that moves through the support and the fastener to coat one or more of the threads. An alternative means may be provided to bring the powder spray nozzle in proximity to the female threads of an internally threaded fastener such as a nut. The air nozzle may be mounted on a block which switches on a carriage that is reciprocally mounted on a rod attached to a pneumatic air cylinder. The carriage is mounted to the rod through a time delay unit which enables the mounted air nozzle to remain within the nut for a predetermined period of time so it may be accurately positioned to adequately apply powder to the threads.

Other aspects of the apparatus with a fixed support can include an angularly disposed support surface so that fasteners slide down the so-called downtrack by gravity. A gate or end stop at the end of the downtrack controls the movement of the fasteners and is interactively connected to the reciprocating nozzle.

Also disclosed is a preferred embodiment of a powder feed system which includes a reservoir, a nozzle, a vibrator with amplitude control, and an exit tube that runs both above and through the reservoir, with the tube having at least one aperture through which powder exits. A powder supply tube runs from the exit tube to the nozzle, and preferably the two tubes are not connected, so that negative air pressure in the powder supply tube does not draw powder through the exit tube. The exit tube more preferably includes a spring loaded or self-locking male fastener to adjust and maintain the size of the aperture in the exit tube and thereby additionally control the rate of powder feed.

Various methods are disclosed for efficiently coating small quantities of samples of different types of threaded fasteners. In addition, more precise and efficient means of controlling the reciprocation of the nozzle and the actuation of the spraying process are described.

DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

FIG. 12 is a schematic diagram of the operation of the powder spray assembly of the embodiment illustrated in FIG. 6 with the nozzle in the up position;

DESCRIPTION OF THE PREFERRED EMBODIMENTS

Figure 1:
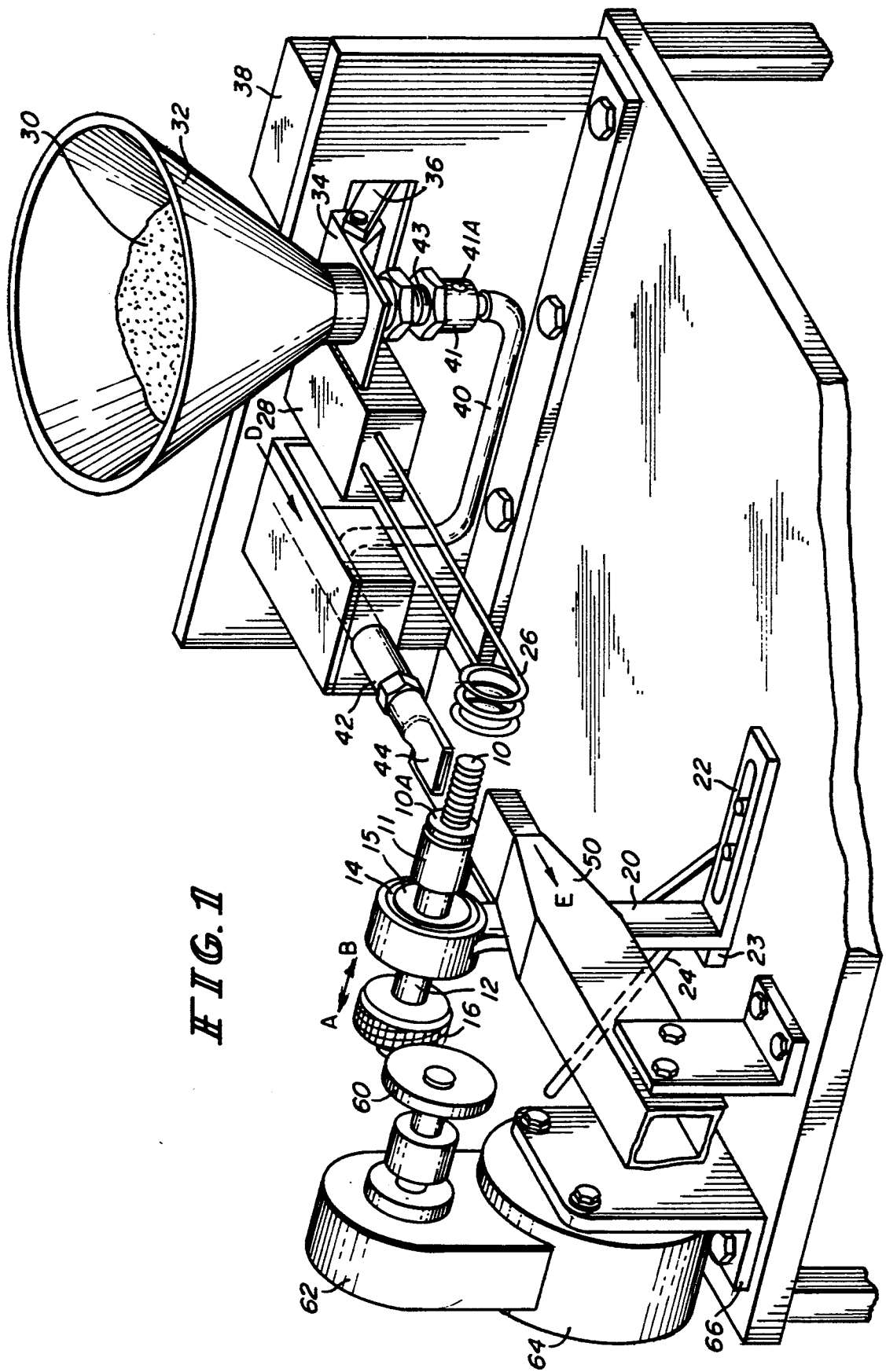
FIG. 1 is a perspective view of one embodiment of the invention used to produce externally threaded fastener samples.

FIG. 1 depicts one embodiment of the device used to process externally threaded fastener samples of all types. A means for holding and reciprocating a fastener such as stud sample 10 with head 10a includes magnet assembly 11. The magnet assembly, which is resistant to temperatures as high as 800° F., is comprised of an aluminum sleeve containing an Alnico V permanent magnet assembly. The sleeve is attached to one end of a steel shaft 12 that is held in a double row angular contact ball bearing 14 to allow rotation with minimum wobble. Seals 15 are typically employed at each end of the bearing housing. A knurled wheel 16 is attached to the other end of shaft 12 to provide rotation via friction drive as described below.

The magnet assembly, shaft 12, bearing 14, and wheel 16 are mounted on bracket 20, which is attached to linear ball slide 22. The slide 22 allows restricted linear motion which is necessary for positioning of the fastener 10 with respect to coil 26 and spray nozzle 44. Reciprocating motion, as indicated by arrow AB, can be facilitated by handle 24. The preferred embodiment contemplates that the fastener will be moved by hand, but conventional electromechanical means known to those of ordinary skill in the art can also be employed. An induction generator 28 provides power to coil 26. The generator 28 may include but is not limited to a 5 kw, 50 khz or 10 kw, 450 khz generator.

The induction coils 26 should be tailored to fastener length and diameter to obtain uniform heating. The head end of the stud will tend to be cooler than the other end due to the heat sinking capacity of the head and magnet assembly. To compensate for this, more energy needs to be applied to the head end. This may be accomplished by having the coil turns spaced closer together or of smaller diameter at the head end. The free end of the stud should protrude through the coil approximately 3.0 to 3.5 mm.

Once a fastener 10 has been heated by coil 26, it is coated with a thermoplastic powder, or other resilient resin. The powder is supplied by a powder metering and supply means which includes a powder reservoir 32. Powder supply is regulated by controlling the vibration applied to reservoir 32 and/or the negative pressure developed in powder supply line 40. Reservoir 32 sits on bracket plate 34. The plate 34 is moved by the arms 36 of vibrator 38, which provides up to 7200 cycles per minute and possesses an amplitude adjusting controller.

As the reservoir 32 is vibrated, powder 30 falls through rotatable sleeve 41 with aperture 41A, inside tube section 43. As powder 30 falls into pipe 40, forced air is supplied through pipe 42 in the direction of arrow D. This creates a negative pressure in powder supply pipe 40 so that the powder 30 moves from supply pipe 40 to nozzle pipe 42 and forces the powder 30 through nozzle 44 onto heated fastener 10. Excess powder is removed by vacuum pick-up 50 in the direction of arrow E. Alternative dust collection systems known in the art can also be used. An alternative of this supply technique is discussed below and illustrated in FIG. 13, and ensures that the powder feed rate is a function only of the vibration of the reservoir.

A means for rotating the fastener engages the sample holding means. Rotary motion is accomplished by a friction drive through rubber wheel 60 mounted on gear reducer 62 and driven by a fractional horsepower D.C. motor 64, which can be but is not limited to a Bodine D.C. model ff 560, type NSH-12RH. The motor is controlled by an appropriate speed controller (not shown). The motor is mounted on bracket 66 in spaced relation to the sample holding means so that adequate engagement is provided between the rubber wheel 60 and the knurled wheel 16 for rotation of the latter.

Various support tables or frames can be used to adapt to the configuration of this and other embodiments.

The preceding embodiment is typically used for coating steel weld studs and screws with a size range of M6×15 mm through M12×50 mm, although both smaller and larger diameters and longer lengths can be accommodated. The method of coating these fasteners begins with the centering of the stud on the magnet to prevent wobbling during rotation. The center line of nozzle 44, which is preferably adjustable in all directions, is aligned with the center line of stud 10. Nozzle 44 should be positioned approximately 6 to 10 mm, more preferably 6.5 to 9.7 mm, from the stud. This will assure that nozzle 44 clears both the stud head 10A and the magnet assembly 11.

The induction generator 28 is adjusted to heat a stud to approximately 700° F. to 900° F., and more preferably 770° F. to 825° F., in three to five seconds. Temperature can be measured by a non-contact sensor system, a melting temperature crayon, or temperature measuring liquid. Motor speed is adjusted to 60 rpm, with the air flow set at 90 psi at 40 scfm. The powder flow rate is controlled principally by the amplitude of vibration, and secondarily by the negative pressure in pipe 40 and the adjustment of aperture 41A. Increasing amplitude and air flow while reducing the aperture opening increases powder flow.

An initial trial should be made with the motor speed and air flow as described above. Vibrator amplitude should be set at 50 percent and the aperture left completely open. The stud 10 is manually advanced until its threaded portion is within coil 26. Generator 28 is energized until the threaded portion reaches its desired temperature. The bracket 20 with stud 10 is retracted along linear ball slide 22 to stop 23, engaging wheel 60 and knurled wheel 16. The vibrator 38 is then turned on, causing powder to flow. The rotating stud 10 is then sprayed, usually for 3 to 10 seconds, until the proper coating weight is achieved. Typical coating weights are approximately 0,062 grams for an M10×35 mm piece and approximately 0,091 grams for an M12×35 mm piece. After the initial set-up, trial runs and the necessary alignment and adjustments have been made, production of the samples can be commenced.

Figure 2:
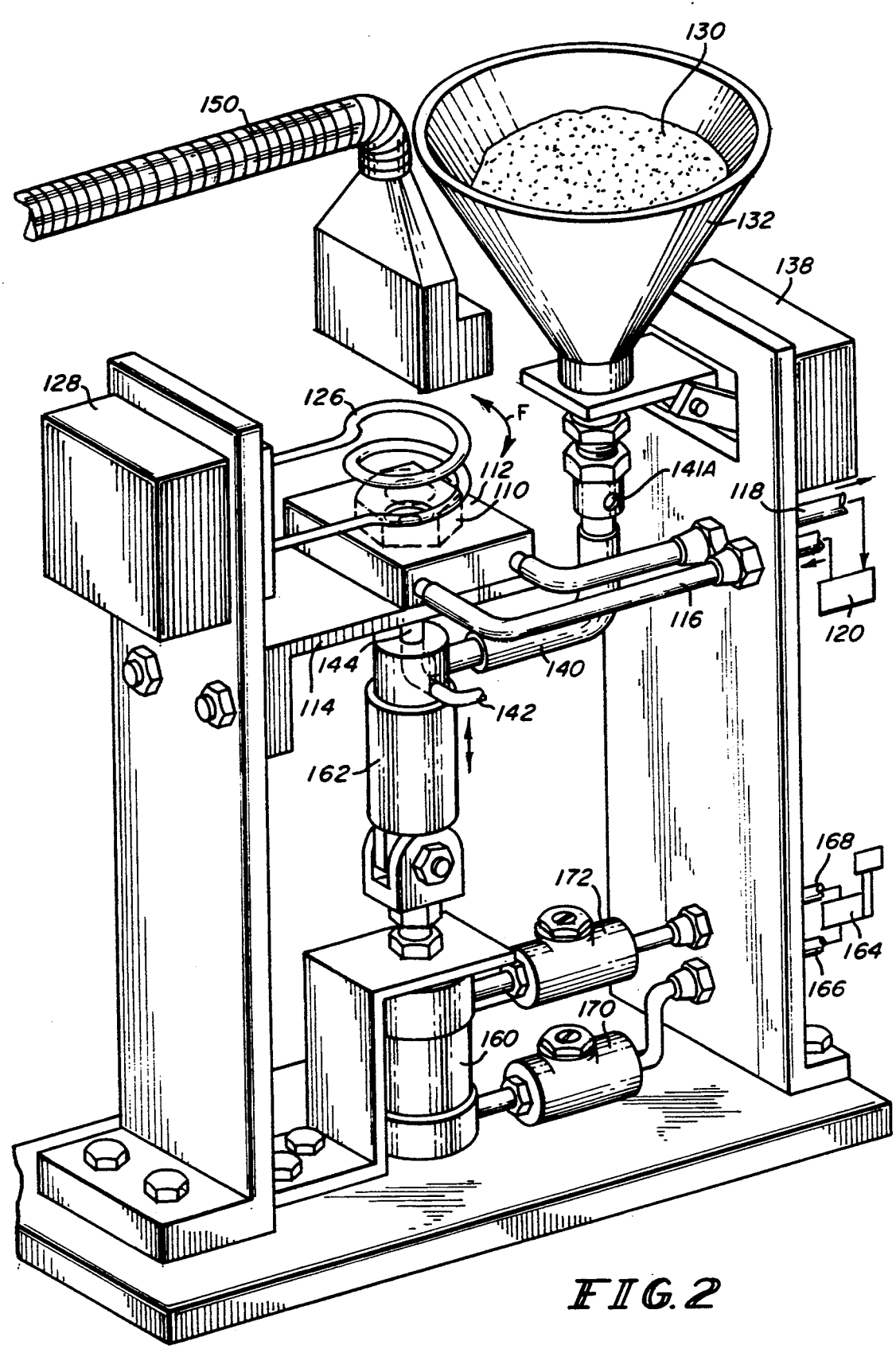
FIG. 2 is a perspective view of one embodiment of the invention used to produce internally threaded fastener samples.

FIG. 2 depicts an additional embodiment of a sample machine for coating the inside of an internally threaded fastener such as nut 110. Heat is supplied by coil 126 and generator 128 in a manner similar to that described above. The coil 126 preferably has two or three turns and is rotatably mounted as indicated by arrow F, permitting easy access to nut 110. Alternatively, if the coil is not rotatably mounted, the inside diameter of the coil should be large enough so that nuts can be passed through the top of the coil and placed on support block 112. The powder metering and application system is also similar to that described above. Powder 130 in reservoir 132 is provided through supply pipe 140. Control of the powder flow is provided in part by high velocity air supplied through tubing 142, vibrator 138, and aperture 141A. Dust collection unit 150 removes any excess powder 130.

Figure 15:
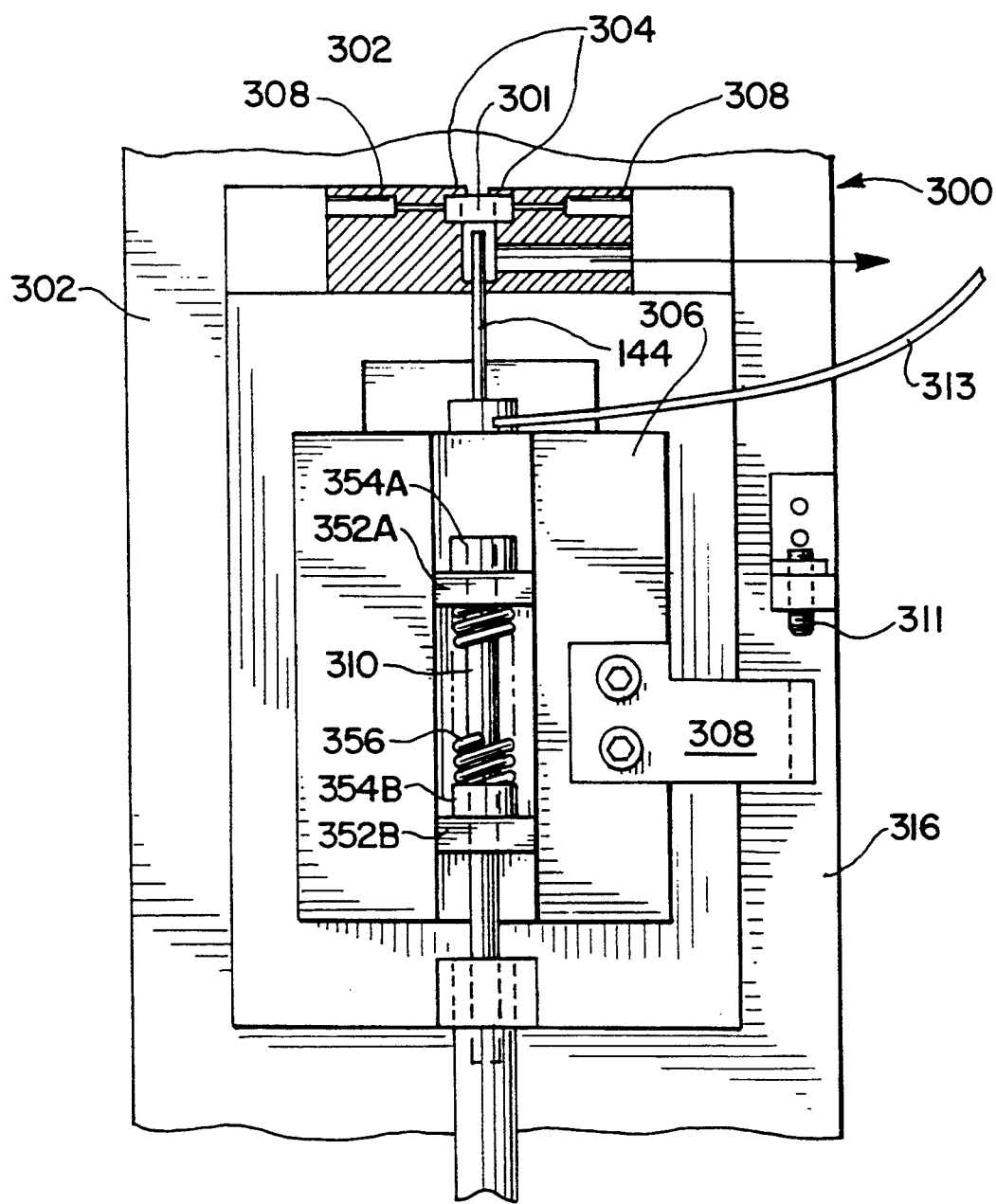
FIG. 15 is a front view of an alternative embodiment of the air cylinder and air nozzle arrangement.

A fixed means for supporting fastener 110 includes a cored aluminum block 112 supported on bracket 114. The cored block 112 permits the flow of water for cooling. Water is carried to block 112 by tube 116 and returned by tube 118 to pump 120. Pump 120 can be a submersible pump or a self-priming vertical centrifugal pump. A capacity of one to three gallons per minute at 10 feet of head is adequate capacity. Block 112 has a hole in its center so that nozzle tube 144 can be vertically reciprocated through the block to apply powder to the internal portion of nut 110, whose threaded opening is aligned with the opening in block 112. A piece of brass stock (not shown), with an upwardly extending lip, and dimensioned for each nut size, can be attached to the top of block 112 to facilitate centering of the nut. Alternatively, as shown in FIG. 15, block 112 may be of a shape that surrounds the fastener such as spray block 302. This embodiment provides for controlled guidance of the fasteners through the apparatus. Hold-down lips 304 ensure that fasteners are maintained properly positioned on the spray block. Additionally, vacuum passageway 306 allows for removal of excess powder.

A reciprocating means for applying the powder includes a nozzle holder 162 mounted on a double action pneumatic cylinder 160. Working air for cylinder 160 is directed by a solenoid activated four way directional control valve 164, which controls air flow through tubes 166 and 168. Flow control valves 170 and 172 in each air line 166 and 168 are used to adjust the speed of the stroke of the piston of cylinder 160.

Figure 3:
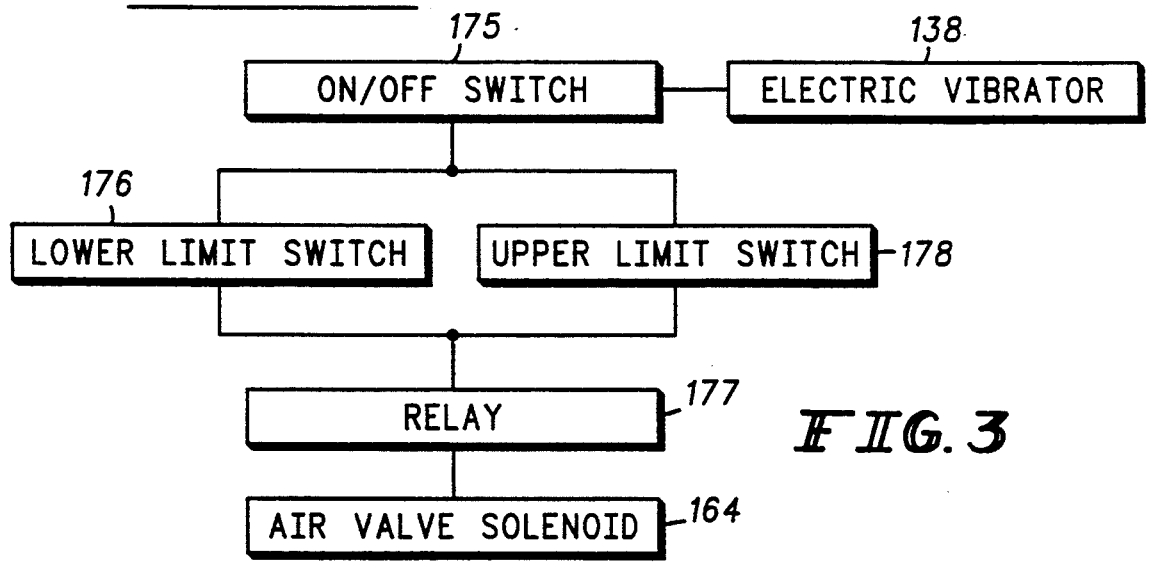
FIG. 3 is a wiring diagram showing the essential connections that control the reciprocating powder nozzle of the embodiment illustrated in FIG. 2.

The operation of the reciprocating nozzle can be best understood with reference to the ,wiring diagram in FIG. 3. Two adjustable limit switches, lower switch 176 and upper switch 178, provide the means for controlling and adjusting the cylinder stroke. Either magnetically activated reed switches or electronic microswitches can be used. When power is turned on at power switch 175, the vibrator and the air valve solenoid are activated. Air flows through the solenoid valve into line 166, extending the piston of cylinder 160. At this instant current flows through both microswitches 176 and 178. As the piston 160 advances, lower microswitch 176 is opened. When nozzle holder 162 reaches its maximum height, upper switch 178 is opened, switching solenoid air valve 164 so that air is diverted from line 166 and into tube 168, thus retracting the piston of cylinder 160. When the downstroke of the piston of cylinder 160 is completed, lower limit switch 176 is closed. At this point the cycle is complete and the power can be shut off.

Nozzle holder 162 is mounted on a linear ball slide (not shown) to ensure that nozzle 144 does not wobble and is guided through the hole in the support block and into the nut.

The lower edge of nozzle 144 can be flush with the bottom surface of nut 110 to coat all threads. Alternatively, if it is desired to leave some threads uncoated, the nozzle should begin its upward stroke from a point further inside the threaded portion of nut 110. The powder spray air from line 142, which exits nozzle 144, creates negative pressure in powder supply tube 140, thus transporting powder 130 into nozzle 144 for application to nut 110.

In the preferred embodiment nozzle 144 sprays powder while the nozzle is going up and down inside the threaded fastener. A constant supply of air through line 142 is always provided, even when vibrator 138 is deenergized after lower switch 176 is closed. While lower switch 176 may not necessarily be adjustable, at least switch 178 must be vertically adjustable to account for different fastener thicknesses. Different fastener characteristics will require additional features on the powder spray assembly. For example, the nozzle 144 should be vertically adjustable. This is necessary if the fastener 110 has an unthreaded (and so not to be coated) portion that is deeper in distance than the space between the two microswitches.

Figure 13:
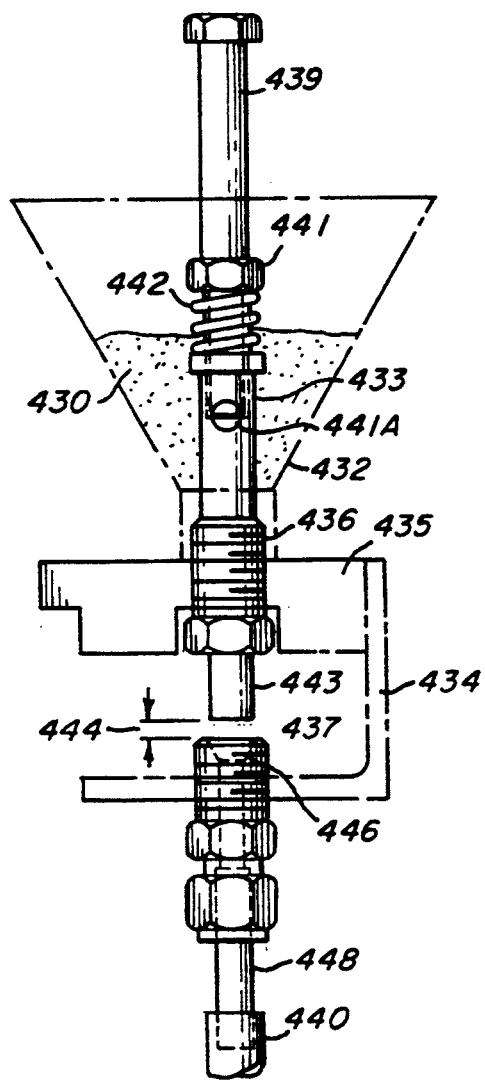
FIG. 13 is an elevation view of the powder supply assembly which can be incorporated in the embodiments illustrated in FIGS. 1, 2 and 6.
Figure 14:
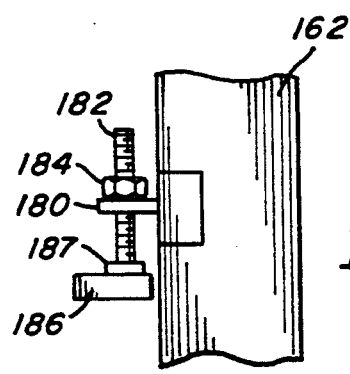
FIG. 14 is an elevation view of the bracket and microswitch that control the vibratory powder feed mechanism.

Another desirable feature is the addition of another microswitch that controls the powder flow preferably when the vibrator, and not air to the spray nozzle, is the only device controlling the powder flow rate. This embodiment of the powder feed system is described later (FIG. 13). The additional microswitch 186, shown in FIG. 14, is operated by a bracket 180 with an adjustable screw 182 and nut 184. Bracket 180 is attached to nozzle holder 162. This is also known as an overtravel switch, and permits control of the powder feed so, for example, the counterbored (unthreaded) portions of the nut are not coated. Switch 186 remains open during the vertical travel of its plunger 187. Only when plunger 187 is completely released by screw 182 is switch 186 closed to permit powder feed. Thus, bracket 180 and screw 182 control the length of travel of plunger 187, which corresponds to the length of the counterbored section.

The bracket 180 with the adjustable screw 182 keeps the over travel switch 186 open, so that the nozzle moves upward and air is supplied to the nozzle, but no powder is supplied to the nozzle until it passes the counterbored section and enters the threaded portion of the fastener that requires coating. Similarly, as the piston retracts through the fastener, the switch 186 is opened as the nozzle moves from the threaded portion to the counterbore portion, shutting off the powder flow to the nozzle. This feature eliminates human errors that occur if the powder is controlled by an operator.

Figure 16:
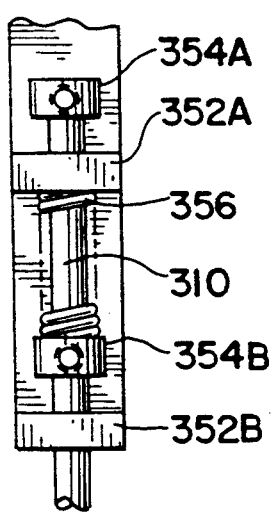
FIG. 16 is an isolated front view of the time delay unit in operation.
Figure 17:
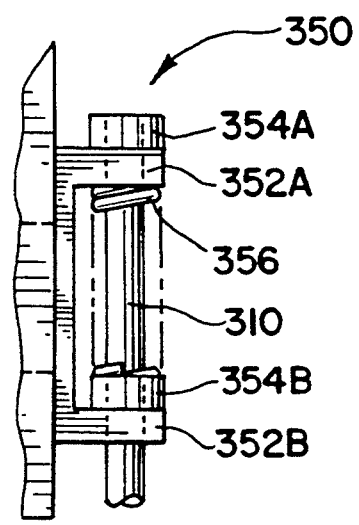
FIG. 17 is a side view of the time delay unit when not in operation.

Turning to FIG. 15-18, an alternative embodiment is shown that utilizes an alternative mechanism to reciprocate the air powder nozzle 144 within the proximity of the inner threads of the fastener. In FIG. 15, apparatus 300 includes spray block 302 which guides fasteners over the air powder nozzle. The air nozzle 144 is supported by carriage 306 which has striker plate 308. Disposed on carriage 306 is a bracket assembly 350, as seen in FIG. 17. Bracket assembly 350 includes two brackets 352a and 352b. Rod 310 passes through aligned holes (not shown) in the brackets. Stops 354a and 354b are provided on rod 310 to control reciprocation of the rod through brackets 352a and 352b. Spring 356 is disposed around rod 310 and between bracket 352a and stop 354b to maintain the position shown in FIG. 17. Attached to apparatus frame 316 is an adjustable carriage stop 311 which prevents carriage 306 from moving upward past a desired point. Overall, this stop bracket and spring arrangement creates a time delay assembly discussed further below.

Figure 18:
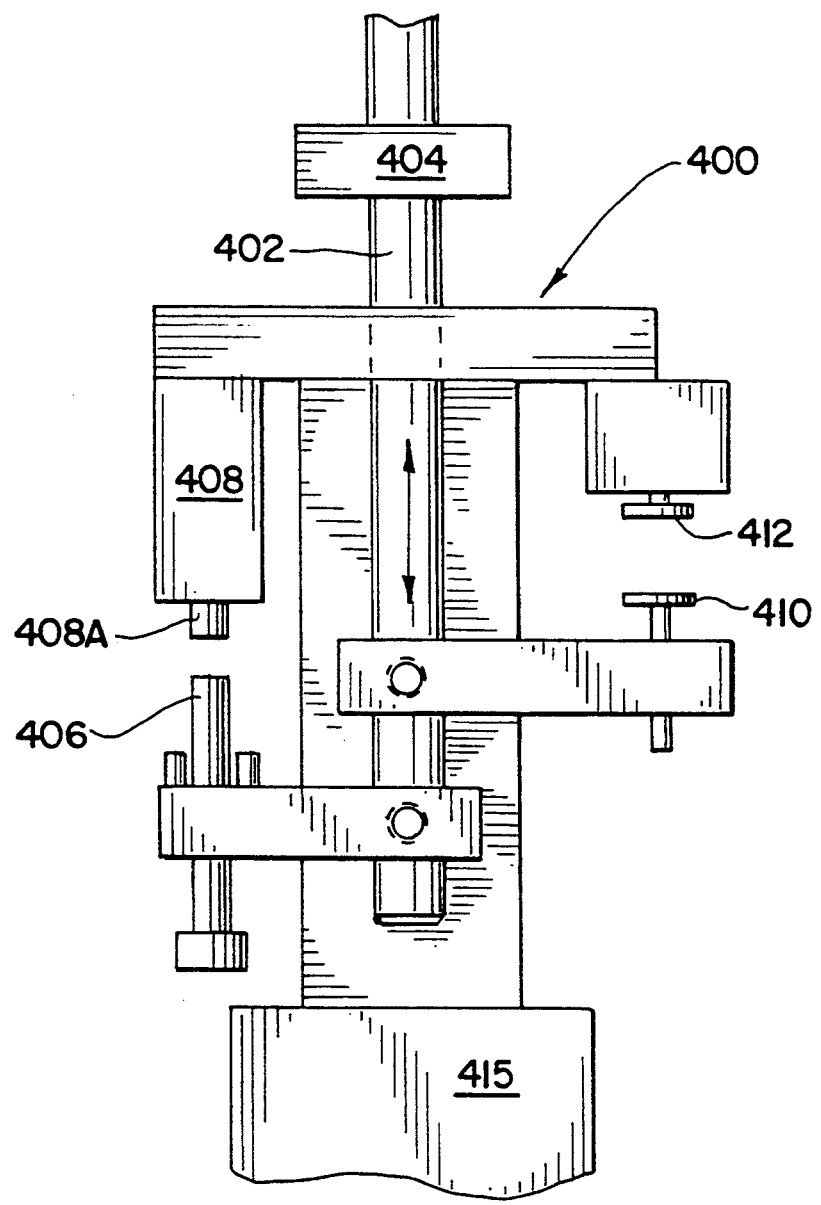
FIG. 18 is a front view of the powder on-off and stroke reversing switches.

In FIG. 18, a powder on/off and stroke reversing switch arrangement 400 is shown. Rod 402 is connected to rod 310 (shown in FIG. 15) via a series of linkage plates, such as linkage plate 404. Due to this linkage plate connection, rods 310 and 402 are parallel and both connected to the air cylinder 415. As a result, rods 310 and 402 move in unison. Cylinder 415 and rod 310 together comprise a powered actuator having a reciprocal travel cycle to linearly move the nozzle 144 into and out of the fastener 301. The fastener 301 includes an aperture on which the internal threads of the fastener are formed.

Still referring to FIGS. 15-18, in the operation of this alternative embodiment, the air cylinder 415 receives a signal from fiber optic sensors 308 when a fastener 301 is present in spray block 302 and ready for spraying. When this signal is received, the spraying cycle begins.

Once the cycle is started, rod 310 will extend upward, due to its connection via the linkage plates, raising the entire carriage assembly 306 with nozzle 144 affixed thereon. The carriage 306 moves upward until striker plate 208 contacts adjustable carriage stop 311. At this point, nozzle 144 will be located within the nut disposed in spray block 302. Rod 310 continues to move upward in biased fashion from spring 356 lifting stops 354a and 354b off their respective brackets 352a and 352b, as shown in FIG. 16. It can be seen in FIG. 18 that when rod 402, which moves in unison with rod 310, moves sufficiently upward, adjustable powder on/off stop 406 will communicate with contact 408a of powder on/off switch 408. When powder switch 408 is turned on, the powder feed assembly, of the like shown in FIG. 13, will be activated to supply powder. Powder flows from the feed assembly through powder supply tube 313 and out through nozzle 144 and onto the internal threads of the fastener. During powder spraying, rod 310 is still moving through aligned holes of brackets 352a and 352b while nozzle 144 remains stationary within the fastener because carriage 306, which it is affixed to, is stopped in place due to striker plate 308 being in abutting relationship with adjustable carriage stop 311. This bracket and stop arrangement is a time delay unit which allows the nozzle 144 to remain within the fastener for a predetermined period of time. When rod 402 moves sufficiently upward, stroke adjusting stop 410 contacts stroke reversing switch 412 causing air cylinder to reverse its stroke causing both rods 310 and 402 to move downward. When rod 402 moves sufficiently downward, adjustable powder on/off stop disengages with the powder on/off switch causing the powder supply to the threads of the fastener via air nozzle 144 to stop.

When rod 310 moves even further downward, stops 354a and 354b will return to their resting place on brackets 352a and 352 and striker plate 308 will lift off adjustable carriage stop 310 causing nozzle 144 to be lowered and removed from the spray block from within the threaded fastener. When rod 310 is completely lowered, the cycle has now ended and the fastener is removed in a similar fashion to other embodiments to prepare for a new cycle.

Of particular importance is the time delay unit which consists of stops 354a and 354b, and brackets 352a, 352b and spring 356. The time delay unit permits the use of an air cylinder with an adjustable constant stroke rate while maintaining nozzle 144 within the threads of a fastener during powder application. Various elements may be adjusted to fine tune the invention to the particular needs of the user. For example, if the nut to be sprayed is thicker or wider, the nozzle 144 must reach higher into the fastener. Therefore, adjustable carriage stop 311 may be adjusted higher so carriage 306 will be stopped at a higher position. Similarly, if a lighter powder application is desired, adjustable powder on/off stop 406 can be lowered so it must travel further to contact powder on/off switch 408. As a result, spraying is delayed and the time until engagement of the stroke reversing switch is decreased which results in less powder spraying. Further, the stroke adjusting stop 410 can be adjusted to control the stroke length of the air cylinder 415. Overall, these adjustments of the invention enable the user to fine tune the operation of the apparatus for a variety of fasteners.

Figure 4:
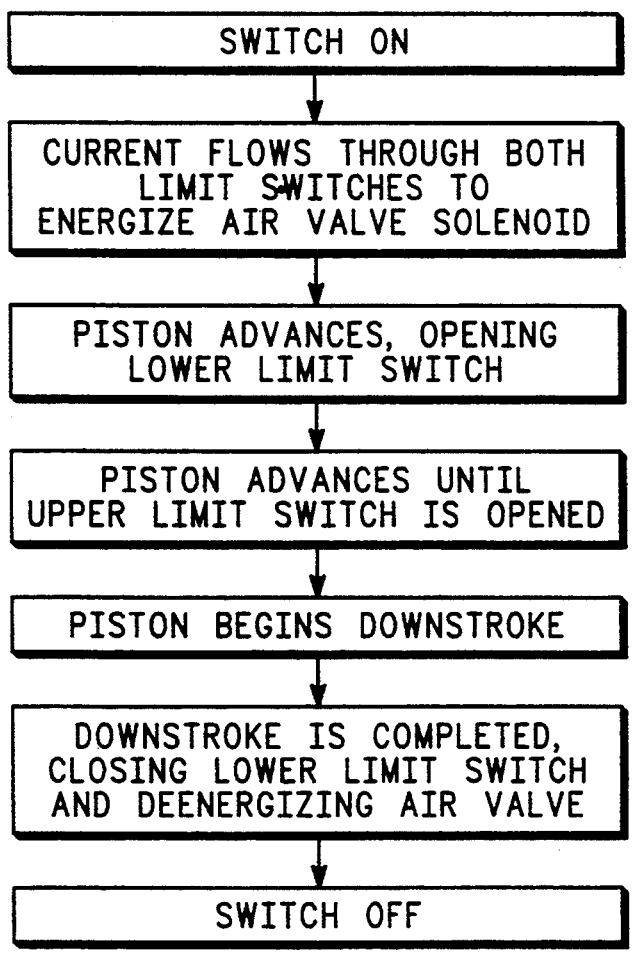
FIG. 4 is a block diagram illustrating the sequence of operation of the air cylinder in the embodiment illustrated in FIG. 2.

The set-up and operation of the nut sample machine is similar to the stud machines described earlier, with changes obviously made to accommodate the different features. FIG. 4 is a flowchart of the general operation of the air cylinder, which moves the nozzle during coating. In setting up the machine, the nozzle is positioned with respect to the bottom of the nut, the limit switches, such as the stroke adjusting stop 410, are adjusted to coordinate the cylinder stroke with the nut thickness, and then the cooling water for the support block is turned on. The time it takes for the nut to reach approximately 800° F. plus or minus 25° F. is measured, the powder spray air and dust collector are activated, and then the vibrator control is set at 50 percent and the aperture 141A is left wide open. Coating can then be applied by activating on-off switch 175 to cycle through the operating sequence of the reciprocating spray nozzle. In the embodiment of FIGS. 15-18, the sequence is regulated by fiber optic sensors 308.

After the first sample is coated it should be inspected for coating weight and continuity of coating. Then the appropriate adjustments can be made. Typical coating weights are as follows:

M6×1.0 Pierce Nuts 0.023 grams/piece
M8×1.25 Pierce Nuts 0.036 grams/piece
M6×1.25 Weld Nuts 0.027 grams/piece
M8×1.75 Weld Nuts 0.071 grams/piece The normal size range of the nuts, which can be ferrous or non-ferrous, is from M6×1.0 to M12×1.75, although larger and smaller pieces may also be easily coated.

Figure 6:
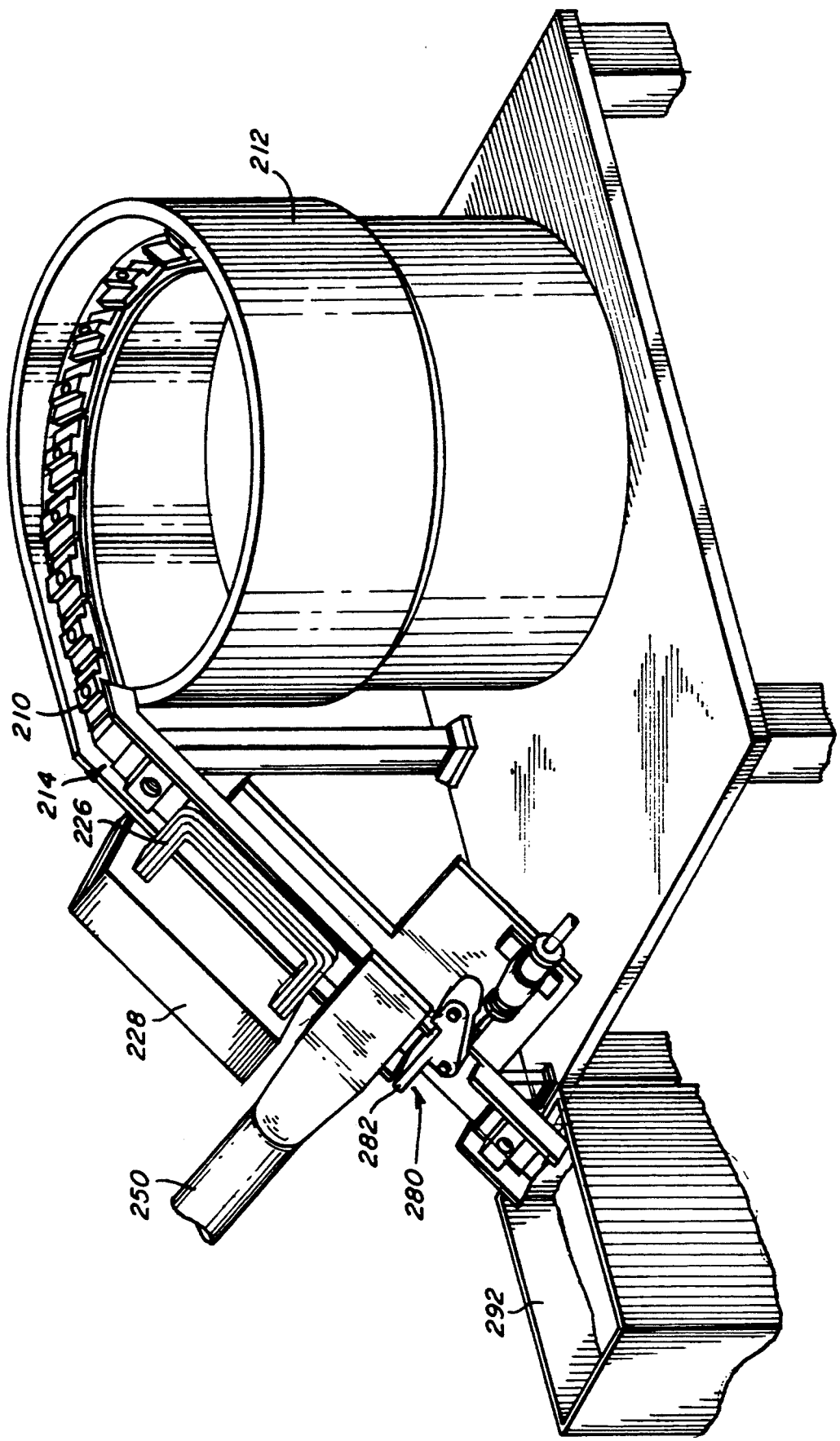
FIG. 6 is a perspective view of a second embodiment of the invention used to produce internally threaded fastener samples and which can operate in a continuous mode.

FIG. 6 depicts another embodiment of a nut sample machine, this one capable of coating a continuous supply of various types of threaded articles such as nuts 210. A typical continuous supply means 212, such as any commercial vibratory feeder properly tooled to orient the fastener, supplies nuts 210 to downtrack 214. Alternatively, the nuts can be fed manually onto downtrack 214. Gravity impels the nuts along downtrack 214 through induction heater 226, which is powered by generator 228. At the bottom of downtrack 214 gate means 280 controls the movement of the nuts, so that a powder coating can be applied and then the coated nut is released and another nut is allowed to slide into place for coating.

Figure 11:
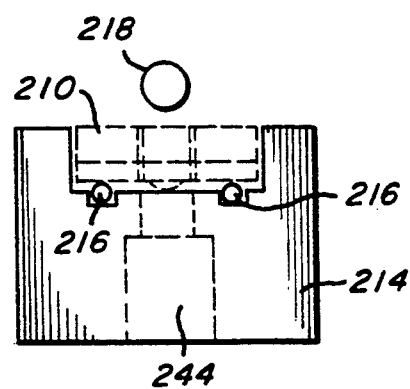
FIG. 11 is a cross section view of the downtrack of the embodiment illustrated in FIG. 6.

Downtrack 214 is depicted in cross section in FIG. 11. Track 214 includes, but is not limited to, a high temperature non-asbestos material such as non-asbestos "Transite" with glass rods 216 provided to eliminate friction as the nuts slide. Upper glass rod 218 is adjustably fixed to ensure that nuts 210 are held down and do not buckle or fall out of downtrack 214. Induction heater 226 heats the nuts so that powder coating can be applied to the internal threads. In another contemplated embodiment not shown, the bottom of downtrack 214 is flattened to a generally horizontal position so that nut 210 is horizontal and nozzle 244 and cylinder 260 operate vertically rather than at an angle.

FIG. 12 depicts the general wiring and operational features of the powder application means. Reservoir or funnel 232 is vibrated by vibrator 238. The vibration and forced air provide powder to supply pipe 240 in a manner similar to that previously described. Air is supplied to the: nozzle 244, creating negative pressure in pipe 240, and drawing powder into the nozzle. When air electric solenoid or solenoid controlled air valve 264 is opened, air flows to double acting air cylinder 260, whose stroke speed is controlled by flow control valves 270 and 272. The piston of cylinder 260 moves nozzle holder 262 between adjustable microswitches 276 and 278.

The application of powder is actuated by a signal from the gate means 280, as will be described below. When a signal is provided to relay 277, both solenoids 264 and 265 are activated. Air is then supplied to cylinder 260, moving it upward, while solenoid 265 permits air flow to nozzle 244. Power is simultaneously supplied to vibrator 238. When the piston of air cylinder 260 is extended so that upper microswitch 278 is contacted, the cylinder piston begins to retract until it contacts switch 276. This causes the vibrator and air flow through solenoid air valve 264 to stop.

Figure 7:
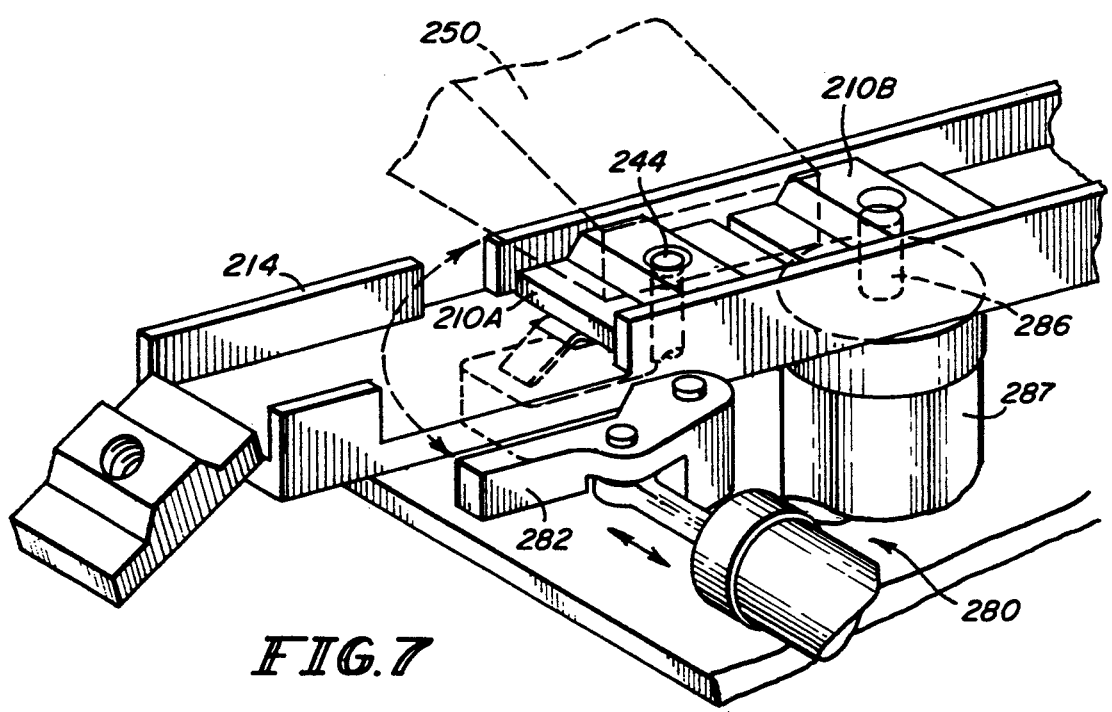
FIG. 7 is a perspective view of the discharge end of the embodiment illustrated in FIG. 6.
Figure 5:
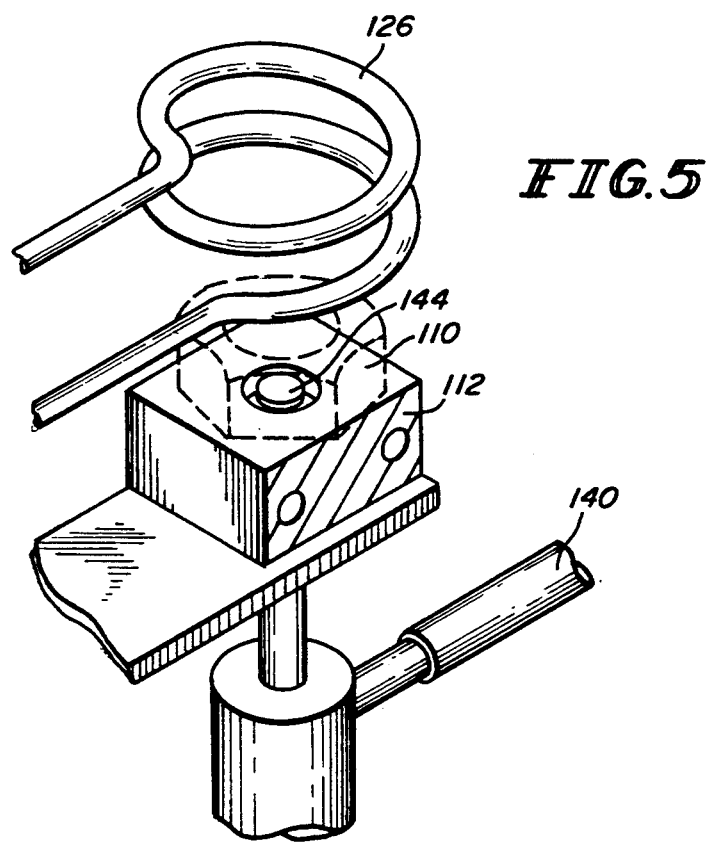
FIG. 5 is a perspective view of the support block of the embodiment illustrated in FIG. 2, with the nozzle set at the bottom of the fastener.
Figure 8:
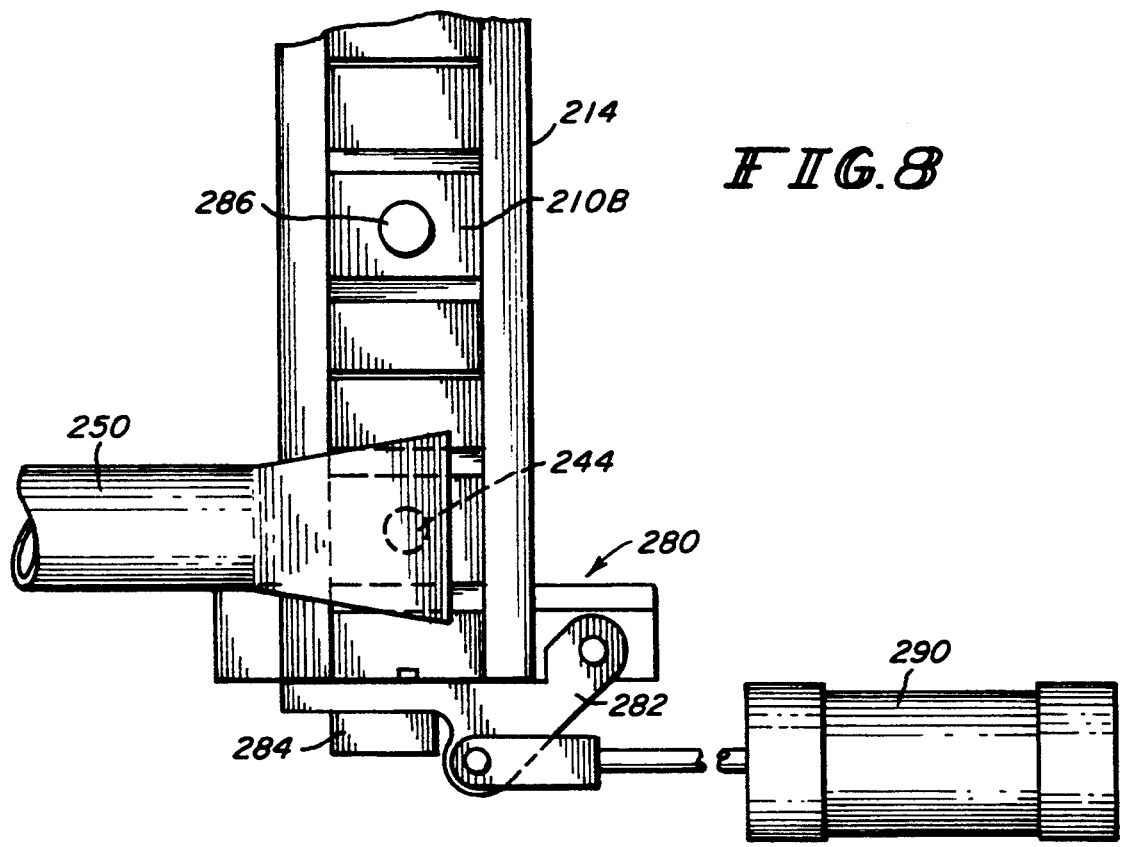
FIG. 8 is a plan view of the discharge end of the embodiment illustrated in FIG. 6.
Figure 9:
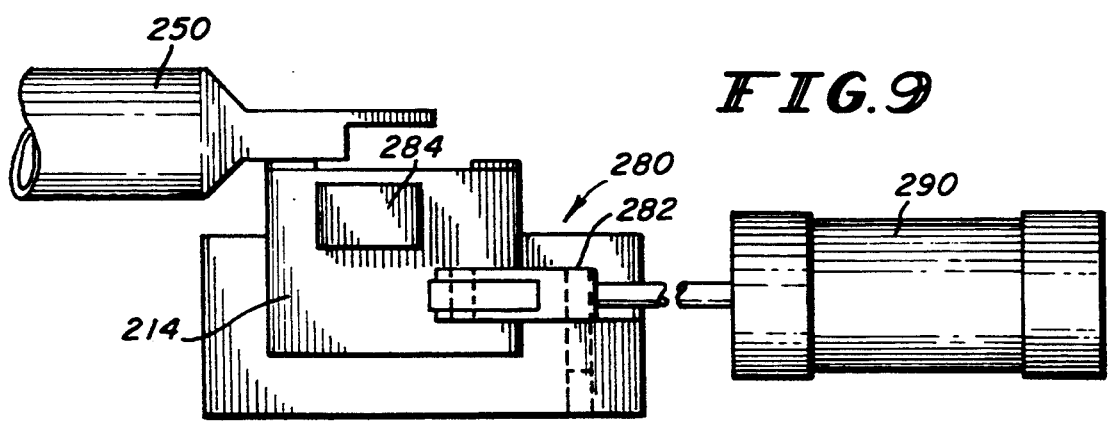
FIG. 9 is an elevation view of the discharge end of the embodiment illustrated in FIG. 6.
Figure 10:
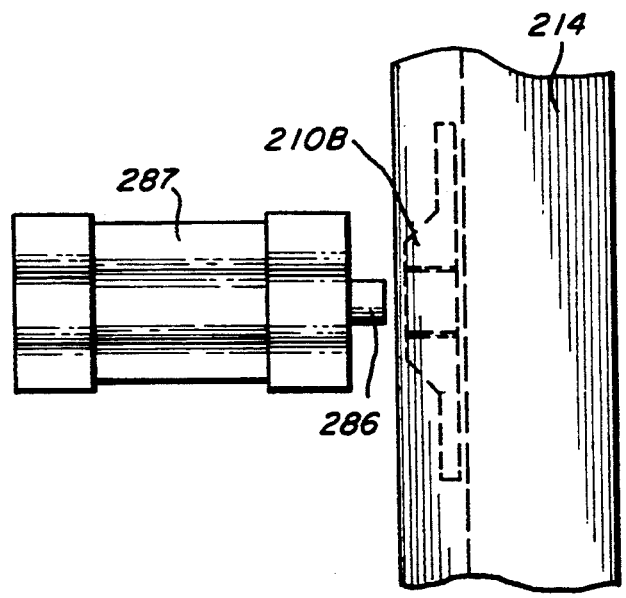
FIG. 10 is an elevation view of the stop mechanism for the workpiece following the coated internally threaded fastener of the embodiment illustrated in FIG. 6.

FIGS. 7, 8, and 9 depict gate means 280 which may be used in conjunction with all embodiments. A gate or end stop 282 holds nut 210A in place for coating by nozzle 244. End stop 282 includes microswitch 284, which when contacted by nut 210A signals and controls the powder spray mechanism described above. When spraying is complete, the retraction of nozzle holder 262 removes nozzle 244 from the threaded interior of nut 210A. Holder 262 contacts microswitch 276 when nozzle 244 is completely withdrawn from nut 210A. The signal from microswitch 276 causes double action air cylinder 287 to actuate and move stop 286 through the threaded portion of nut 210B, thus holding the next workpiece. While nut 210B is held in place, double action air cylinder 290 opens end stop 282 and nut 210A slides off downtrack 214 into cooling or rust prevention bath 292. Alternative removal devices such as conveyors can be placed at the end of downtrack 214. When end stop 282 closes, the stop 286 for the next piece, nut 210B, is withdrawn. FIG. 10 depicts one embodiment in which stop 286 is above downtrack 214, whereas FIG. 7 depicts it below the track. Nut 210B then slides down track 214 until it is stopped by closed end stop 282. Contact of the nut with microswitch 284 restarts the powder application cycle. As powder is sprayed on the threaded portion of the nut, dust or vacuum collection system 250 removes excess powder.

FIG. 13 is an alternative embodiment of the powder feed assembly, using only a vibrator to control the powder feed rate and may be used with each of the various embodiments of the invention. Powder 430 in reservoir 432 is supported by bracket 434 and support surface 435. As the vibrator (not shown) shakes reservoir 432, powder 430 falls through aperture 441A in tube 433 into tube 443. The powder 430 passes through air gap 444, funnel 446, tube 448, and into powder supply tube 440. Supply tube 440, as with tube 40, is subjected to a negative pressure by the air supplied to the powder spray nozzle (not shown in FIG. 13). Air gap 444 eliminates the effect of that negative pressure, so that the powder feed rate is solely a function of the vibration, and so powder is not accidentally sprayed when air is supplied to the nozzle but the system is otherwise not operational. Hex head, externally threaded elements 436 and 437 permit the adjustment of gap 444.

Hex cap screw 439 can be turned so that the position of the bottom of the screw 439 determines the size of aperture 441A, which thus affects the powder supply rate. Hex nut 441 and compression spring 442 keep screw 439 from loosening during vibration. Alternatively, screw 439 can be self-locking to accomplish this same purpose. Aperture 441A can be varied in size, and in fact a plurality of holes can be placed around the circumference of tube 433, limited of course by powder characteristics and the size of tube 433. In addition, effective powder metering can be accomplished by providing an annular opening or space between an appropriate seat in tube 433 and the cooperating end of screw 439.

Of course, it should be understood that various changes and modifications to the preferred embodiments described herein will be apparent to those skilled in the art. For example, the solenoid valve 164, air pipes 166 and 168, and flow control valves 170 and 172 can be eliminated by using a Valve-in-head cylinder manufactured by Allenair Corp. and attaching an adjustable stroke kit to the cylinder. Such changes and modifications can be made without departing from the spirit and scope of the present invention and without diminishing its attendant advantages. It is, therefore, intended that all such changes and modifications be covered by the following claims.

What is claimed is:

1. An apparatus for applying a coating of resin material to the internal threads of a threaded fastener, said fastener having a fastener aperture, said apparatus comprising:

a support for said fastener, said support having a support aperture in substantial axial alignment with said fastener aperture;

an air-powder nozzle for spraying powdered resin material onto the internal threads of said fastener;

a reciprocating actuator having a reciprocal travel cycle to linearly move said nozzle into and then out of said fastener aperture;

a movable carriage mounted to said actuator and carrying said nozzle;

a delay assembly to maintain said nozzle in a generally stationary position within said fastener aperture for a predetermined period of time while said actuator continues said reciprocal travel cycle; and an adjustment mechanism for adjustably controlling the movement and position of said carriage and said nozzle in relation to said fastener and said support.

2. The apparatus of claim 1, wherein said actuator is an air cylinder and rod.

3. The apparatus of claim 2, wherein said air cylinder is a double action air cylinder.

4. The apparatus of claim 1, wherein said adjustment mechanism comprises:
- a rod forming a part of said actuator and slidably connected to said carriage; and
- at least one stop connected to said rod to define the boundary of travel of said carriage.

5. The apparatus of claim 1, further comprising a control rod moveable in unison with said actuator and at least one control sensor adjustably mounted to said control rod for adjustably controlling the application of said powdered resin to said fastener.

* * * * *